No. 660,779. Patented Oct. 30, 1900.
L. MADAS.
FENDER FOR TROLLEY CARS.
(Application filed Aug. 17, 1900.)
(No Model.) 3 Sheets—Sheet 1.
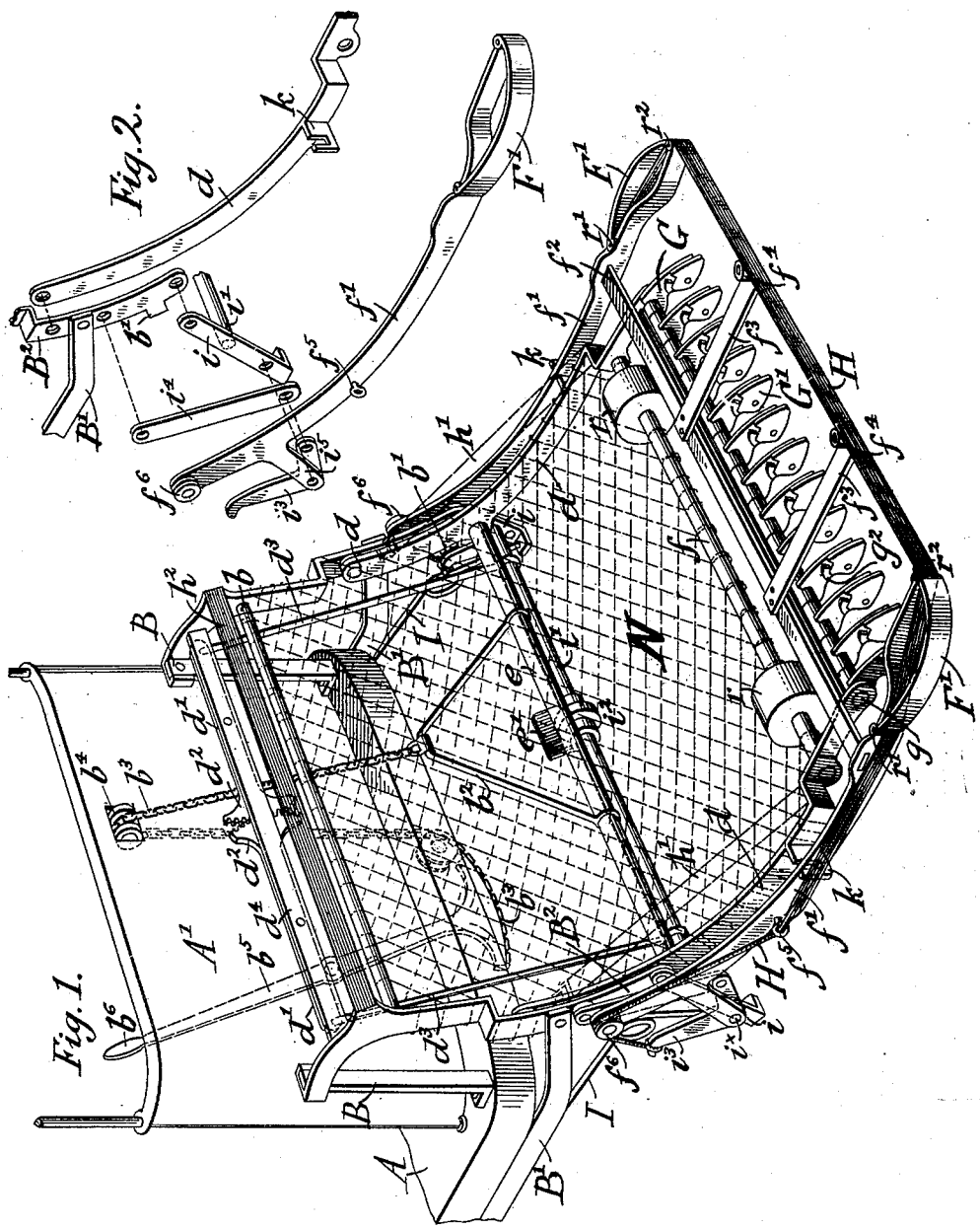
WITNESSES:
INVENTOR,
Lajos Madas.
BY
Goepel & Raegener,
ATTORNEYS

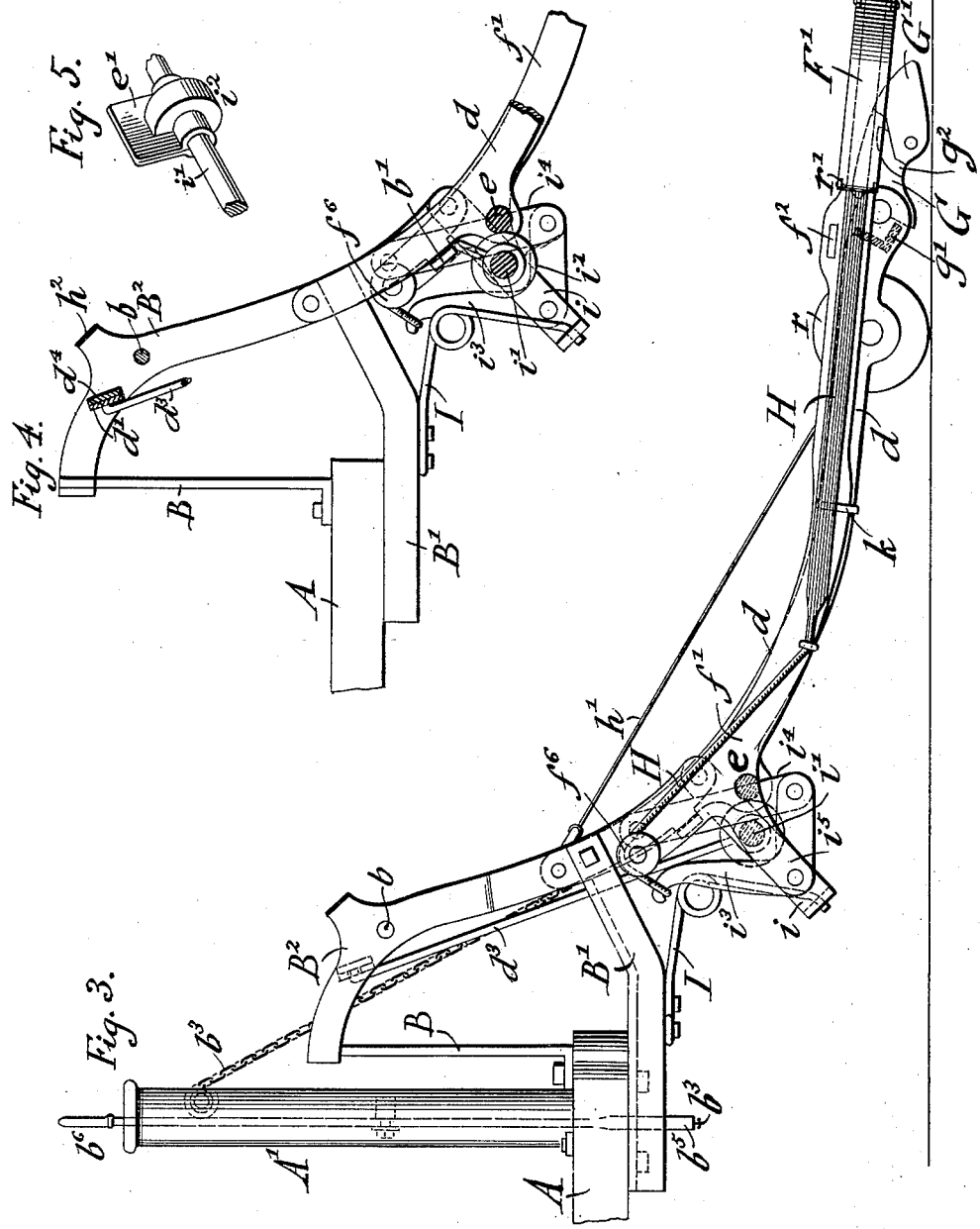

No. 660,779. Patented Oct. 30, 1900.
L. MADAS.
FENDER FOR TROLLEY CARS.
(Application filed Aug. 17, 1900.)
(No Model.) 3 Sheets—Sheet 3.
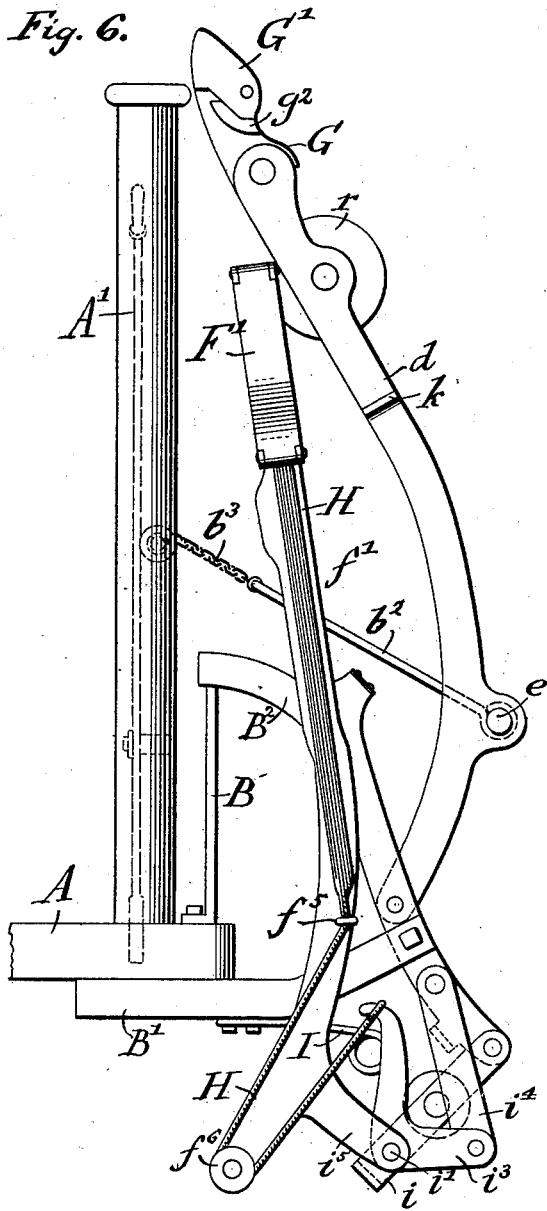
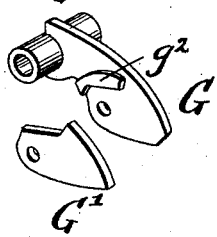
WITNESSES:
INVENTOR
Lajos Madas.
BY Goepel & Raegener
ATTORNEYS

UNITED STATES PATENT OFFICE.

LAJOS MADAS, OF NEW YORK, N. Y., ASSIGNOR OF ONE-HALF TO ADOLF STERN, OF SAME PLACE.

FENDER FOR TROLLEY-CARS.

SPECIFICATION forming part of Letters Patent No. 660,779, dated October 30, 1900.

Application filed August 17, 1900. Serial No. 27,133. (No model.)

*To all whom it may concern:*

Be it known that I, LAJOS MADAS, a citizen of the Kingdom of Hungary, residing in the city of New York, borough of Manhattan, in the State of New York, have invented certain new and useful Improvements in Fenders for Trolley-Cars, of which the following is a specification.

This invention relates to an improved car-fender of that class in which the fender is automatically lowered from a normal raised position somewhat above the rails upon contact with an obstruction, so as to move close to the rails and take up the obstruction.

The invention consists in certain combinations of operative parts, which will be fully described hereinafter and finally claimed.

In the accompanying drawings, Figure 1 is a perspective view of my improved car-fender. Fig. 2 is a perspective view of certain details of the operating mechanism. Fig. 3 is a side elevation of the fender in lowered position. Fig. 4 is a sectional view from the inner side of the fender. Fig. 5 is a detail perspective view of a portion of the mechanism. Fig. 6 shows the fender raised against the dashboard, and Figs. 7 and 7$^a$ are perspective views of the guard-fingers of the fender.

Similar letters of reference indicate corresponding parts.

Referring to the drawings, A represents the platform of a trolley or other car. To the platform are attached, in front of the dashboard A', uprights B, and from the sides of the platform arms B' extend in forward direction. Said supports and arms serve to support bracket-arms B$^2$, the upper ends of which are secured to the uprights B, while the side arms B' are attached to the brackets at some distance from their lower ends. The bracket-arms are connected transversely by a stiffening-rod $b$, which securely holds them in position parallel with each other.

The main frame of the fender is composed of side members $d\ d$, pivoted at their rear ends to the stationary bracket-arms B$^2$ at a point some distance from the end of the same and connected transversely by a stiffening-rod $e$ at a point a short distance in front of the pivotal connection with the bracket-arms and at the front by a second transverse rod $f$, which is provided with rollers $r$. In front of the roller-shaft $f$ is provided another transverse rod $g$, on which are supported, by means of their sleeves, a series of parallel guard-fingers G, which extend in forward direction, as shown clearly in Fig. 1. The guard-fingers are provided at both sides of their sleeves with shoulders adapted to abut against a transverse angle-iron $g'$, arranged close to the sleeves, so that the oscillating motion of the guard-fingers is limited by the angle-iron. Each guard-finger G is provided at one side with a raised abutment $g^2$ and with auxiliary fingers G', which are pivoted to the front part of the main fingers G and project slightly in front of the same. The auxiliary fingers G' abut at their rear part with the abutments $g^2$, so as to have only a limited play upon the main fingers G.

The auxiliary frame is composed of side members $f'$, stiffened by a transverse rod $f^2$, which carries forwardly-extending arms $f^3$, provided with upright rollers $f^4$, pivoted thereto. Each of the side members $f'$ is provided with an outwardly-curved corner portion F', having slots and suitable antifriction-rollers $r'\ r^2$, over which is guided a strong guard-strap H, preferably of woven fabric, which strap extends transversely across the auxiliary frame in front of the fingers G G' and through suitable keepers $f^5$, one on each side member, and over a roller $f^6$ to the elbow-lever $i^3$ of a lowering mechanism. To each bracket-arm B$^2$ is pivoted, at a point above the normal level of the rod $e$, a downwardly-extending link $i$, and the links $i\ i$ are connected below said level by a transverse rod $i'$, carrying a roller $i^2$, adapted to bear on the rod $e$ and support the same and the main frame thereby. To the lower end of each link $i$ is pivoted on a pivot $i^\times$ the elbow-lever $i^3$, and at the outside of said lever $i^3$, on the same pivot $i^\times$, the heel $i^5$ of the side member $f'$. The strap H is connected to the rear end of the elbow-lever $i^3$, while the forward end of the lever is pivoted to a link $i^4$, pivoted to the bracket B$^2$. The extreme end of the link $i$ is bent at an angle, as shown in Fig. 1, and to said angular portion is secured one end of a coil-spring I, the other end of which is secured to the arm B'. Said spring has a tendency to throw the lower end of the link $i$ forward, thereby swinging the rod $i'$ forward beneath the rod $e$, with its roller in contact therewith and maintaining the entire main frame in a position slightly raised from the ground and from the stops $b'$, which extend in inward direction from the brackets $B^2$ and limit the downward movement of the main frame. The forward swing of the link is limited by the strap H, which becomes taut and prevents further movement of the elbow-lever $i^3$. Forward movement of the auxiliary frame relatively to the main frame is also limited by the abutment $e'$ on the rod $i'$ contacting with the rod $e$. The members $f'$ are supported by and longitudinally movable in keepers $k$ of the members $d$ of the main frame.

The bracket-arms $B^2$ are firmly connected by a transverse bar $d^4$, to the rear side of which are fulcrumed levers $d'$, which are provided at their adjacent inner ends with intermeshing segments $d^2$ and connected at their outer ends by rods $d^3$ with the rod $i'$.

At both sides of the main frame are arranged yielding guard-straps $h'$, which serve as side guards for preventing the rolling off of a body after the same is in the net. A guard-strap $h^2$ extends from one bracket-arm $B^2$ to the other and serves for preventing the contact of the body with the dashboard.

To the rod $e$ of the main frame is attached, by means of a strap $b^2$, a chain $b^3$, which passes over a roller $b^4$ in the dashboard to the arc-shaped lower end of a lever $b^5$, the upper end or handle $b^6$ of which is located in a convenient position for operation by the motorman of the car. This mechanism serves for raising the entire fender from the position shown in Fig. 1 to that shown in Fig. 6 and for lowering the fender.

The operation of the fender is as follows: The obstruction upon the track will be first encountered by the guard-strap H or one of the members $f'$. If by the strap, the same will be drawn over the rollers $f^6$, pulling the rear end of the lever $i^3$ toward the same and swinging thereby the link $i$ in backward direction, so that the roller $i^2$ rolls out from beneath the rod $e$ and permits the main frame to drop slightly until it is supported on the stops $b'$, with the fingers G very close to the ground. By the lowering of the main frame the auxiliary frame is also lowered and the obstruction is gathered up and passed into the net N. If, on the other hand, the obstruction strikes a member $f'$, said member is forced in backward direction, and thereby the link $i$ swung backward against the tension of the spring I and the fender-frames lowered, as before and as shown in Fig. 3, and the obstruction gathered up. By the backward movement of the member $f'$ the elbow-lever $i^3$ is also carried backward, and its hooked end swings toward the roller $f^6$, thereby loosening the guard-strap H. When the obstruction is removed from the net, the spring throws the link $i$ and elbow-lever forward again, together with the auxiliary frame, thereby raising the fender-frames into their normal position and drawing the guard-strap H taut.

The equalizing device, comprising the levers $d'$ and their connections, serves for securing equal backward movement of both side members $f'$ whether the strap H or one of said side members encounters the obstruction, so that the fender drops to the same extent at each side. The raising and lowering mechanism $b^2$, $b^3$, $b^4$, and $b^5$ is permitted sufficient play so as to not interfere with the dropping of the fender when an obstruction is encountered.

The dropping of the fender upon striking an obstruction is automatic and instantaneous, so that the guard-fingers pass close to the ground and gather up the obstruction before it can pass beneath the fender and car.

Having thus described my invention, I claim as new and desire to secure by Letters Patent—

1. A car-fender, consisting of stationary bracket-arms, a main frame pivoted at its rear end to said bracket-arms, rollers at the front part of the main frame, guard-fingers on said main frame forward of said rollers, a net on said main frame, means for maintaining the main frame in a normal raised position, and means for automatically dropping said main frame, said dropping means extending forward of the main frame and guard-fingers and being actuated by impact with the obstruction, substantially as set forth.

2. A car-fender, consisting of stationary bracket-arms, a main frame pivoted at its rear end to said bracket-arms, rollers at the front part of the main frame, guard-fingers on said main frame forward of the rollers, a net on said main frame, means for maintaining the main frame in a normal raised position, means for automatically dropping said main frame, and an equalizing device for securing the dropping of the main frame evenly at both sides, substantially as set forth.

3. In a car-fender, the combination, with stationary bracket-arms, of a main frame pivoted to the same and provided with rollers and guard-fingers at the front end of the same, an auxiliary frame consisting of transversely-connected side members, a guard-strap extending transversely in front of the guard-fingers, mechanism for keeping the guard-strap taut, and means for dropping the main and auxiliary frames upon contact of the guard-strap or auxiliary frame with an obstruction, substantially as set forth.

4. In a car-fender, the combination, with stationary bracket-arms, of a main frame pivoted thereto and provided at its front end with rollers and guard-fingers, an auxiliary frame consisting of transversely-connected side members supported on the main frame, a guard-strap extending transversely in front of the guard-fingers, mechanism for keeping the guard-strap taut, means for automatically dropping the frames on contact of the strap or auxiliary frame with an obstruction, and means connected with the main frame for raising both frames against the dashboard of the car, substantially as set forth.

5. In a fender for trolley-cars, the combination, with stationary bracket-arms, of a main frame pivoted thereto and provided with rollers and guard-fingers at the front end of the same, an auxiliary frame consisting of transversely-connected side members supported on the main frame, a guard-strap extending transversely in front of the guard-fingers, mechanism for keeping the guard-strap taut, means for automatically dropping the frames on contact of the auxiliary frame or strap with an obstruction, means for equalizing the drop of both sides of the frames, and means connected with the main frame for raising both frames against the dashboard of the car, substantially as set forth.

6. In a fender for cars, the combination, with stationary bracket-arms, of a main frame, pivoted to said bracket-arms, an auxiliary frame guided along the sides of the main frame, a guard-strap supported upon the auxiliary frame, tension mechanism for keeping the guard-strap taut, and means interposed between the main frame and auxiliary frame for lowering both frames simultaneously when the guard-strap or auxiliary frame meets an obstruction, substantially as set forth.

7. In a fender for trolley-cars, the combination, with stationary bracket-arms, of an auxiliary frame supported on the main frame, a guard-strap supported on the auxiliary frame, fulcrumed equalizing-levers connected with the auxiliary frame, and spring-actuated mechanism connected with the stationary brackets, main and auxiliary frames, for keeping the guard-strap taut and the frames in a normal raised position, substantially as set forth.

8. In a car-fender, the combination, with stationary bracket-arms, of a main frame pivoted to said bracket-arms, rollers at the front end of said main frame, a series of guard-fingers arranged in front of said rollers and adapted to oscillate on said frame, and a net extending from the roller-shaft over the main frame and bracket-arms, substantially as set forth.

In testimony that I claim the foregoing as my invention I have signed my name in presence of two subscribing witnesses.

LAJOS MADAS.

Witnesses:
PAUL GOEPEL,
J. H. NILES.